United States Patent [19]

May et al.

[11] 4,304,325
[45] Dec. 8, 1981

[54] CONVEYOR SYSTEM AND CONVEYOR APPARATUS THEREFOR

[75] Inventors: Kenneth D. May, Buffalo Grove; Peter Agnello, Park Ridge; John T. Bell, St. Charles, all of Ill.

[73] Assignee: Container Corporation of America, Chicago, Ill.

[21] Appl. No.: 125,491

[22] Filed: Feb. 28, 1980

[51] Int. Cl.³ .............................................. B65G 47/40
[52] U.S. Cl. .................................... 198/424; 198/420; 198/440; 198/484; 198/706
[58] Field of Search ............... 198/420, 424, 436, 440, 198/448, 449, 484, 706

[56] References Cited
U.S. PATENT DOCUMENTS
1,099,266  6/1914  Olson .............................. 198/424 X Primary Examiner—Jeffrey V. Nase
Attorney, Agent, or Firm—R. W. Carpenter; Davis Chin

[57] ABSTRACT

A conveyor system comprising a lane conveyor for moving articles in separate lanes with random spacing between the articles, an endless conveyor having article receiving carriers thereon each arranged to receive one or more articles from a lane of said lane conveyor, a second lane conveyor having lanes thereon preferably greater or less in number than the number of lanes in the first lane conveyor, and structure for simultaneously discharging a number of the carriers so as to distribute the articles substantially equally among the lanes of the second lane conveyor. Provision is made to prevent repetition of failure to load a lane in such instances where the number of lanes in the first lane conveyor is equal to the number of lanes in the second lane conveyor.

3 Claims, 10 Drawing Figures

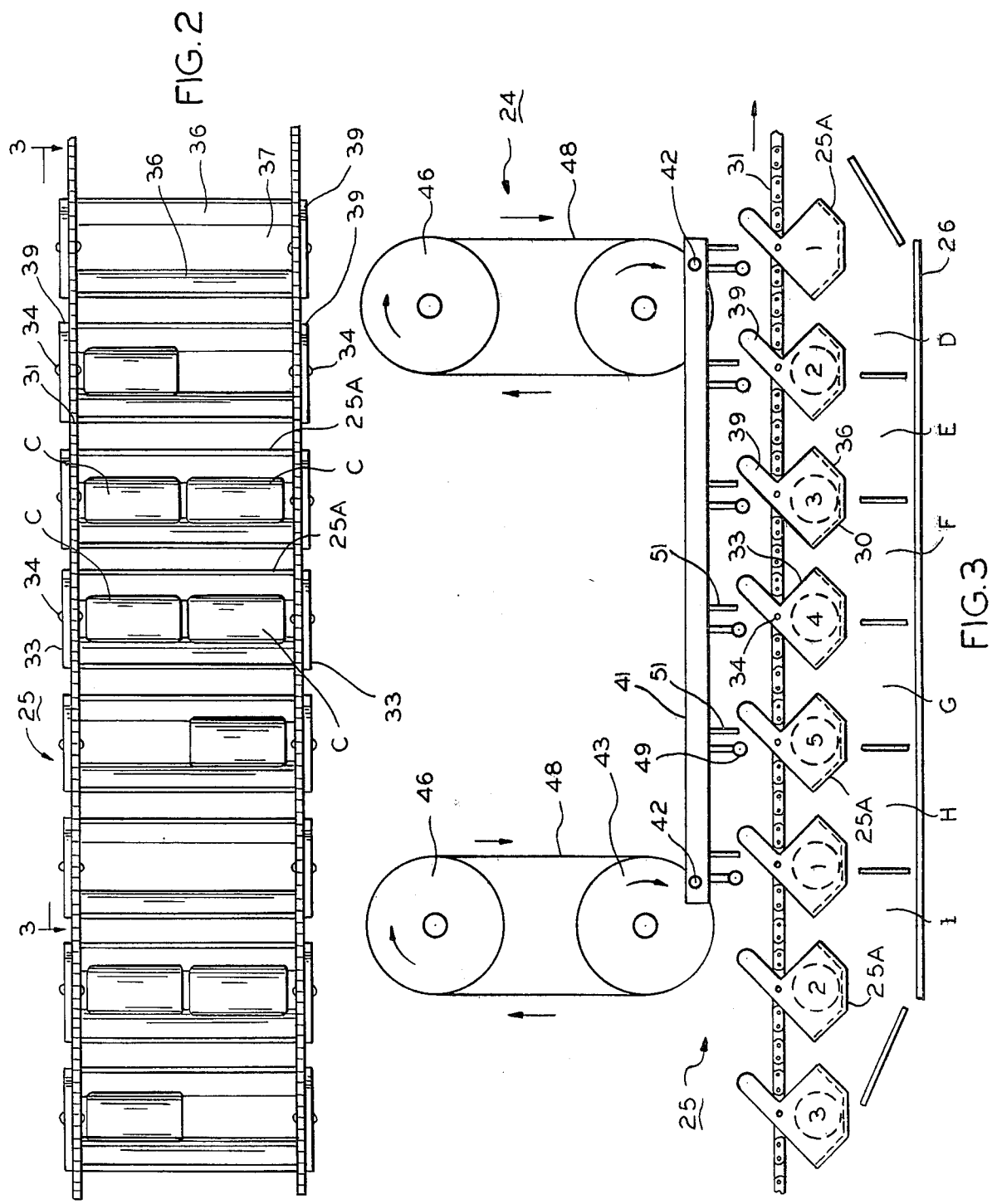

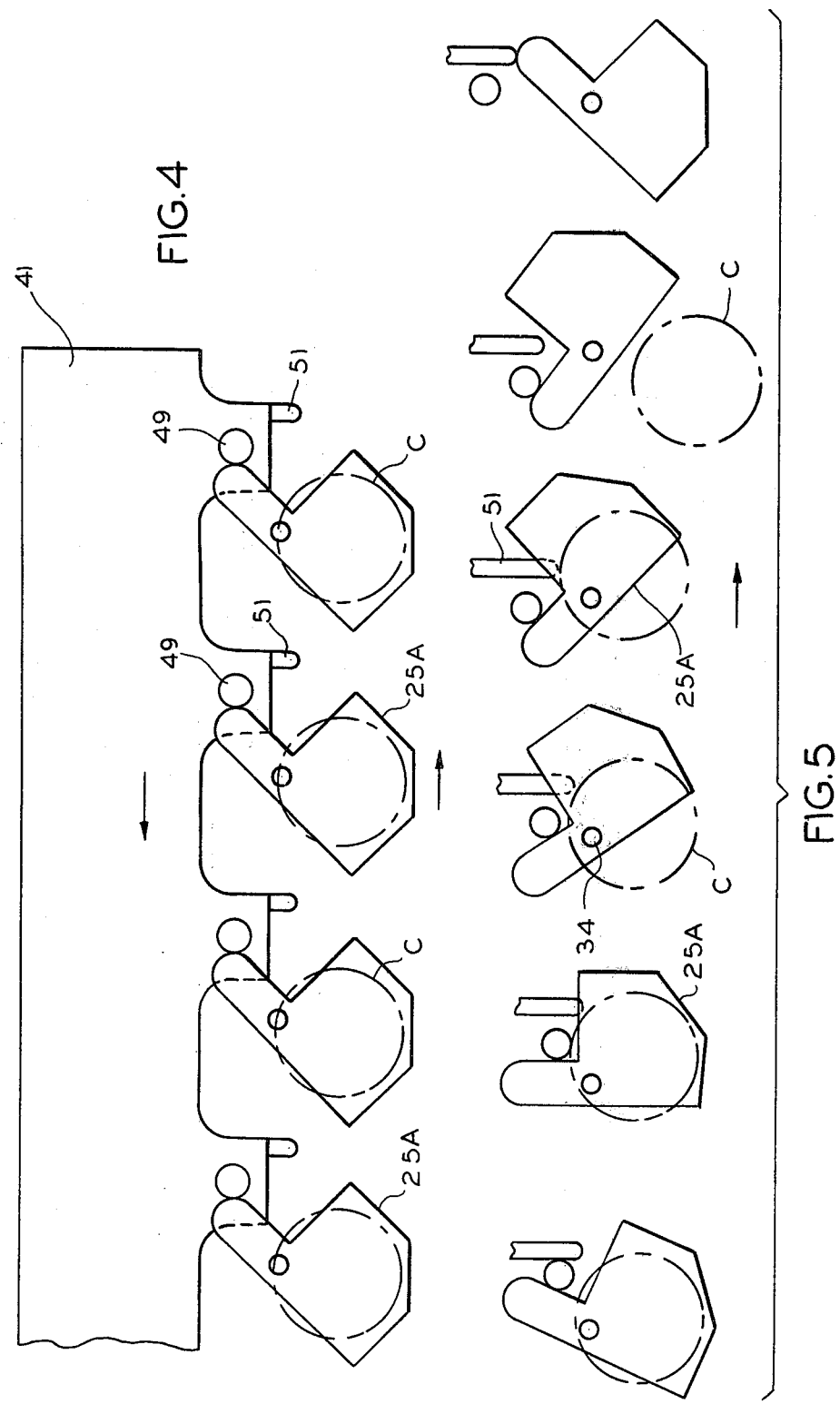

FIG. 8

| D | E | F | G | H | I | ARRAY NO |
|---|---|---|---|---|---|---|
| 1 | 2 | 3 | 4 | 5 | 6 | 1 |
| 7 | 1 | 2 | 3 | 4 | 5 | 2 |
| 6 | 7 | 1 | 2 | 3 | 4 | 3 |
| 5 | 6 | 7 | 1 | 2 | 3 | 4 |
| 4 | 5 | 6 | 7 | 1 | 2 | 5 |
| 3 | 4 | 5 | 6 | 7 | 1 | 6 |
| 2 | 3 | 4 | 5 | 6 | 7 | 7 |

MACH. NO. / CONVEYOR LANES 26

FIG. 9

| D | E | F | G | H | I |
|---|---|---|---|---|---|
| 1 | 2 | 3 | 4 | 5 | 6 |
| E' | 1 | 2 | 3 | 4 | 5 |
| 6 | E' | 1 | 2 | 3 | 4 |
| 5 | 6 | E' | 1 | 2 | 3 |
| 4 | 5 | 6 | E' | 1 | 2 |
| 3 | 4 | 5 | 6 | E' | 1 |
| 2 | 3 | 4 | 5 | 6 | E' |

MACH. NO.

FIG. 7

MACHINE NO. / CONVEYOR LANES

| MACH. NO. | D | E | F | G | H | I |
|---|---|---|---|---|---|---|
| 1 | 1 |   |   |   |   |   |
| 2 |   | 2 |   |   |   |   |
| 3 |   |   | 3 |   |   |   |
| 4 |   |   |   | 4 |   |   |
| 5 |   |   |   |   | 5 |   |
| 1 |   |   |   |   |   | 1 |
| 2 | 2 |   |   |   |   |   |
| 3 |   | 3 |   |   |   |   |
| 4 |   |   | 4 |   |   |   |
| 5 |   |   |   | 5 |   |   |
| 1 |   |   |   |   | 1 |   |
| 2 |   |   |   |   |   | 2 |
| 3 | 3 |   |   |   |   |   |
| 4 |   | 4 |   |   |   |   |
| 5 |   |   | 5 |   |   |   |
| 1 |   |   |   | 1 |   |   |

} FIRST ARRAY DISCHARGE
} SECOND ARRAY DISCHARGE
} THIRD ARRAY DISCHARGE

FIG. 10

SIX LANE CONVEYOR 26: LOAD PATTERN OF FIVE SUPPLY LANES 22 FROM FIVE MACHINES 21

| D | E | F | G | H | I |
|---|---|---|---|---|---|
| 1 | 2 | 3 | 4 | 5 | 1 |
| 2 | 3 | 4 | 5 | 1 | 2 |
| 3 | 4 | 5 | 1 | 2 | 3 |

} SEE FIG. 7

SIX LANE CONVEYOR 26: LOAD PATTERN OF SEVEN SUPPLY LANES 22 FROM SEVEN MACHINES 21

| D | E | F | G | H | I |
|---|---|---|---|---|---|
| 1 | 2 | 3 | 4 | 5 | 6 |
| 7 | 1 | 2 | 3 | 4 | 5 |

} SEE FIG. 8

SIX LANE CONVEYOR 26: LOAD PATTERN OF SEVEN SUPPLY LANES 22 FROM SIX MACHINES 21

| D | E | F | G | H | I |
|---|---|---|---|---|---|
| 1 | 2 | 3 | 4 | 5 | 6 |
| E | 1 | 2 | 3 | 4 | 5 |
| 6 | E | 1 | 2 | 3 | 4 |

} SEE FIG. 9

CONVEYOR SYSTEM AND CONVEYOR APPARATUS THEREFOR

BACKGROUND OF THE INVENTION

Field of the Invention

This invention relates especially to the packaging of cylindrical shaped food articles, such as sausages or cheeses encased in synthetic film material. Such articles may be prepared in cartridge packaging machines, and each article is closed at its ends by a clip. Each machine may deliver the product, such as encased sausages, at varying speeds, in end to end random spaced relationship along side by side conveyor lanes, ultimately to be discharged into a carrier array of an endless conveyor moving transversely to the conveyor lanes. The carriers of the endless conveyor are unloaded as an array thereof simultaneously to conveyor lanes of a second lane conveyor where the articles again move in end to end fashion in side by side lanes.

Ultimately, the articles are moved from the last conveyor to structure counting the articles and placing them in groups for final packaging. Such latter structure forms part of patent application Ser. No. 139,853 filed Apr. 14, 1980 and entitled "Apparatus for Accumulating and Stacking Articles," assigned to the assignee of the present application.

SUMMARY OF THE INVENTION

This invention is especially directed to certain steps in the packaging of food products known in the art as "chubs". Such articles may be formed in cartridge packaging machines operating at varying rates, each rate being greatly less than the rate at which the articles may be subsequently packed in containers. Accordingly, a number of such cartridge packaging machines are employed, the outputs of the several machines being combined so as to supply the machine for subsequent packaging operations at a satisfactory rate.

The output from each cartridge pack machine moves in a conveyor lane arranged in side by side relationship with conveyor lanes from the output of the other cartridge pack machines. The spacing of the articles from each machine may differ from the spacing of the articles in the other lanes. By reason of such variation in output and the need for machine reloading and adjustments, not all the conveyor lanes may be moving the products at the same time.

Moreover, the output of the several machines must be combined at a second lane conveyor, wwith each lane having the article moving therein in contacting end to end relationship for final packaging of the articles from the second lane conveyor.

The articles are transferred from the first lane conveyor into the second lane conveyor in such a fashion that the random distribution of the articles in the lanes of the first lane conveyor is compensated, to the end that the articles are substantially evenly distributed amongst the lanes of the second lane conveyor.

This is achieved by an endless conveyor having article carriers thereon receiving the articles from the first lane conveyor and simultaneously discharging the articles from an array of the carriers, so that after multiple discharges the lanes of the second lane conveyor have the articles properly distributed therein.

This may be achieved by having the number of lanes of the first lane conveyor different than the number of lanes of the second lane conveyor with the number of carriers which are simultaneously discharged being equal to the number of lanes in the second lane conveyor.

A feature of the invention resides in the structure for achieving the simultaneous unloading of the carriers for such purpose.

THE DRAWINGS

FIG. 2 is a plan view of an endless article conveyor forming part of the present invention;

FIG. 3 is a rear elevation view of FIG. 2, showing structure for unloading of the conveyor of FIG. 2, said view looking in the direction of the arrows 3—3 of FIG. 2 and in the direction of the arrows 5—5 of FIG. 1;

FIG. 4 is a detailed front elevation view of the structure for unloading the conveyor seen in FIG. 1;

FIG. 5 is a schematic elevational view showing the steps in unloading the conveyor of FIG. 2;

FIG. 7 is a schematic plan view showing a pattern of delivery of the conveyor of FIG. 3; and FIGS. 8, 9 and 10 show patterns of delivery by the conveyor of FIG. 3 according to the number of lanes having articles delivered thereto.

DESCRIPTION OF THE PREFERRED EMBODIMENT

Figure 1:
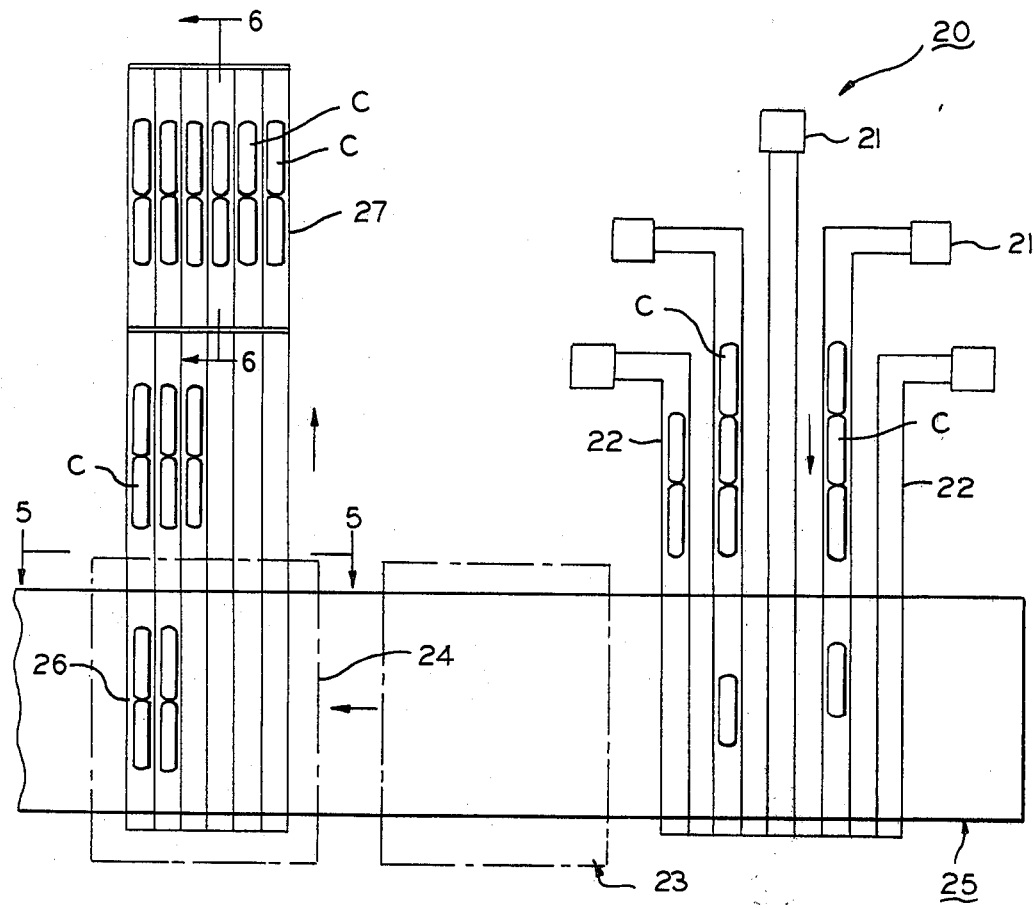
FIG. 1 is a schematic plan view showing the invention structure.

The structure according to the present invention is denoted generally by the reference numeral 20 and is disclosed in the environment of a plurality of cartridge packaging machines 21, each of which delivers an elongate food product, such as sausage, called in the art a "chub," to a lane conveyor 22. The articles are denoted by the letter C.

It should be noted that the outputs of the machines 21 vary and that the chubs C are in each lane of the conveyor 22 in random spaced end to end relationship. Also, by reason of servicing of the machine 21, the delivery lane therefrom may be entirely empty.

The chubs C are delivered to an endless conveyor 25 comprised of article carriers 25A spaced therealong for receiving the chubs C from the conveyor 22. The endless conveyor 25 moves transversely of conveyor 22 to receive the chubs C therefrom. In the transport of chubs C, they may be disposed as a single article or as a pair of same in the carriers 25A of the conveyor 25. In the embodiment disclosed, the carriers 25A are shown where each transports two chubs, but the dimensions of the carriers may be such as to transport as many as ten or more chubs with the articles arranged in an end-to-end relationship.

In many applications, the chubs C are moved through a chiller 23 where they are frozen.

The conveyor 25 transports the chubs C to a carrier unloading device 24 where the chubs C are unloaded from the conveyor 25 and on to an endless lane conveyor 26, where the chubs C are still transported in an end to end properly distributed relationship as will be explained. The conveyor 26 moves transversely of the conveyor 25, so as to receive chubs C in such end to end relationship.

It should be noted that the lane conveyor 26 is of the endless type with roller bar flights (not shown) permitting the conveying flight thereof to move beneath the chubs C if they are arrested in an end to end contacting relationship in each lane. Details of such conveyor are well known in the art.

Figure 6:
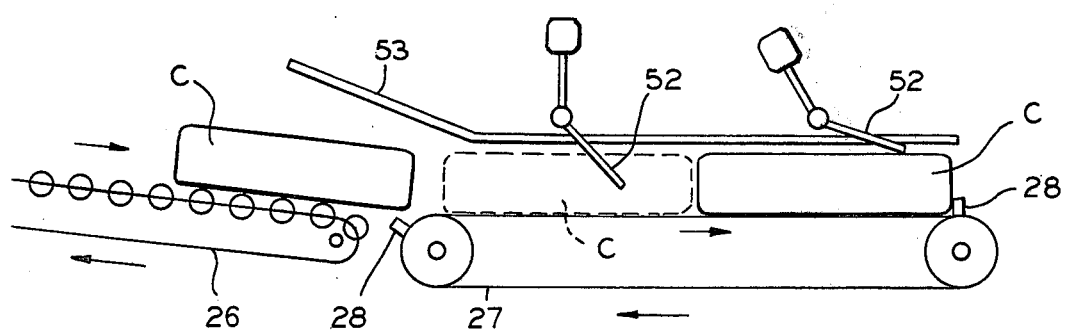
FIG. 6 is a schematic elevational view taken generally along the line 6—6 of FIG. 1, showing structure for sensing the presence of the articles on a delivery conveyor for delivery by same.

The lane conveyor 26 delivers the chubs C to an intermittently operating delivery conveyor 27 having chub engaging flights 28 thereon, see also FIG. 6.

The conveyor 25, best seen in FIGS. 2 and 3, comprises a pair of laterally spaced orbitally movable strands 31, such as the chains shown. The conveyor 25 is shown at the conveying reach thereof, moving from left to right, as seen in FIGS. 2 and 3, and the strands 31 are trained about driving and idler means, not shown, in a manner well known.

In view of the varying output from individual machines 21, the carriers 25A may not be fully loaded. As best seen in FIG. 2, the carriers 25A are shown with random loading as a consequence of the varying output.

The two strands 31 support therebetween the carriers 25A for the chubs C, there being in most cases one or more chubs C in each carrier 25A in end to end relationship supplied from the lane conveyor 22 and the chiller 23.

Each carrier 25A has end walls 33 connected to sloping sides 36 and a bottom 37. Each carrier 25A is supported for swiveling movement with respect to the strands 31 by pintles 34 connected between the end walls 33 and the strands 31. Each of the end walls 33 is provided with a rock arm 39 for rocking the carriers 25A about the pintles 34 to cause carriers 25A to discharge the chubs C on to the lane conveyor 26 best seen in FIG. 1.

In FIG. 3, a portion of the conveyor 25 is shown in position underlying the carrier unloading device 24, where the carriers 25A are in the form of an array, and are each rocked to discharge their contents on separate lanes of the lane conveyor 26.

The carrier unloading device 24 and its functions are best seen with reference to FIGS. 2 to 5. In FIG. 3 such structure is shown schematically. The unloading device 24 comprises an orbitally movable unloader bar 41 pivotally connected at each end 42 to an endless strand 48 trained about pulleys 46 and 43. The pulleys 46 are driven in timed relationship to the conveyor 25, so that the operation of the unloading device 24 causes unloading of the carriers 25A when they are at the lane conveyor 26 and in position thereabove.

The unloader bar 41 is provided with actuators 49 contacting the rock arms 39 to swivel the carriers 25A about the pintles 34 in directions seen more clearly in FIG. 5.

In order to insure the removal of the chubs C from the carriers 25A, the unloader bar 41 is provided with fingers 51 reaching from the bar 41 and into the carriers 25A to engage the chubs C and force them from the carriers 25A upon swiveling movement of same. Such is especially indicated where the chubs C have gone through the chiller 23 seen in FIG. 1.

In operation, the unloader bar 41 moves in an orbital path, and in the lower sweep of its orbit, its tilts the carriers 25A to an extent where the chubs C therein are deposited with proper distribution in the lanes of the lane conveyor 26. It should be noted that in FIGS. 3 to 5, the conveyor 25 is viewed in the direction of the arrows 3—3 of FIG. 2 and 5—5 of FIG. 1, as is also the unloading device 24.

The chubs C moving along the lane conveyor 26 move to the intermittently operating delivery conveyor 27. It is provided with sensors 52 of any suitable kind controlling the delivery conveyor 27, so that it will not operate until all lanes of the delivery conveyor 27 are filled. Since the lane conveyor 26 is constantly urging the chubs C along the lanes thereof, the lanes of the intermittent conveyor 27 should always be filled, and it will cycle regularly, the flight bars 28 thereof urging the leading rows of the chubs C therefrom to the apparatus for grouping the chubs as disclosed in the patent application referred to above.

However, should a lane not be filled, as indicated by the lane sensor 52, the conveyor 27 will not cycle.

One of the features of this invention lies in the fact that the chubs must be unloaded from the carriers 25A on to the lane conveyor 26 by the unloading device 24, see FIG. 4, which must unload the chubs in numbers equal to the number of lanes in the lane conveyor 26. As will be explained later, the number of cartridge packaging machines 21 may be greater or less than or equal to the number shown in FIG. 1.

The number of lanes in the conveyor 26 must be equal to the number of the carriers 25A in a group or array performing simultaneous unloading. Desirably, the number of lanes in the conveyor 26 should not be equal to the number of lanes in the conveyor 22 taking the output from the machines 21.

It should be kept in mind that the spacing of the chubs C in the separate lanes of the conveyor 22 is in accordance with the output of the machine 21 supplying such lane. In the situation disclosed herein, five machines 21 supply six carriers in turn supplying six lanes of the conveyor 26. As seen in FIG. 7, this results in a pattern of supply to the six lanes of the lane conveyor 26. However, after unloading the individual chubs C on the conveyor 26 in spaced end to end relationship initially, as seen in FIG. 1, the chubs C close on each other by reason of the operation of the intermittently operating delivery conveyor 27, the lane conveyor 26 operating continuously with its roller flights.

As seen in FIGS. 1 and 3, the chubs C drop into an array of carriers 25A from five lanes, and corresponding carriers 25A are marked one through five. However, the array of the carriers 25A unloading into the six lanes of the conveyor 26 consists of six carriers. A pattern of deposition exists in the lanes of the conveyor 26, as seen in FIG. 7. The lanes of the conveyor 26 are lettered D through I, as seen in FIG. 3, the chub C in the lane 1 of the conveyor 22 dropping into the lane D of the conveyor 26, the chub C of the lane 2 in the lane E, and so on.

As leading chubs are stopped by the flight 28 of the delivery conveyor 27, the chubs following close contact the leading chubs by reason of the continuing operation of the conveyor 26.

By reason of the pattern seen in FIG. 7, any miss in operation of the cartridge pack machine 21 will be compensated for according to the distribution effected by subsequent discharge of the carriers 25A on to the conveyor 26.

Referring now to FIG. 8, there is shown a pattern existing where the conveyor 26 has six lanes, with the machines 21 being seven in number. If an array of seven carriers 25A is loaded on the conveyor 25 and there are six lanes in the conveyor 26, the seventh carrier 25A will deposit into the lane D, the lane D, the lanes E to I receiving respectively articles 1 through 5 from the next discharging array of the carriers 25A which have gone through the orbital cycle seen in FIG. 3.

As seen in FIG. 9, if there are six operating machines 21, with a carrier array of seven carriers 25A, then with the seventh cartridge machine 21 not in operation, only six of the seven lanes of the conveyor 22 will load at a time. With lane 7 empty, no chub will be furnished thereby, and the resulting empty lanes D through I are denoted E 1 and are distributed across the lanes of the conveyor 26.

As an example, if there are six lanes in the conveyor 26 and six carriers 25A discharge thereto, an absence of supply in one of the lanes of the conveyor 22 will result in a continuing empty lane in the conveyor 26.

FIG. 10 shows the patterns obtained in the combinations of lanes in the conveyors 22 and 26. One of such combinations shows a lane load pattern of six lanes in the conveyor 26, with five lanes in the conveyor 22, with five machines 21 and a carrier array seen in FIG. 3. Other combinations of lanes of the conveyors 22 and 26 are also shown. The carrier array consists of six carriers 25A in each example.

In cases where the number of lanes in the conveyor 26 is equal to the number of machines 21, provision must be made to avoid the possibility that one of the lanes of the conveyor 26 is continuously without the articles C. In order to prevent such possibility, the number of carriers 25A in an array must be one more than the number of lanes of the lane conveyor 22, one of the carriers 25A being empty, so that upon discharge of the carrier array 24, the empty carrier 25A thereof will be distributed across the lanes of the conveyor 26, see FIGS. 9 and 10.

We claim:

1. In an endless conveyor having article receiving carriers spaced therealong for receiving in each carrier of an array thereof an article moving in a lane of a lane conveyor, where the articles of the lane conveyor move in the lanes thereof with random spacing:
   (a) means for discharging the articles in the carriers of the array by tilting each carrier of an array including:
      (i) a movable unloading device including means thereon simultaneously engaging each of the carriers of the array and tilting same to an unloading position;
      (ii) means on said unloading device entering each carrier of said array and engaging the article in said carrier and forcing the article from said carrier upon tilting movement thereof.

2. An endless conveyor according to claim 1, wherein said movable unloader device moves in a path to a successive position to unload a successive array of carriers.

3. And endless conveyor according to claim 1, wherein each carrier is provided with means for engaging said unloader device in its path to cause tilting movement of said carrier.

* * * * *